United States Patent
Simon et al.

(10) Patent No.: US 8,969,233 B2
(45) Date of Patent: Mar. 3, 2015

(54) HYDROCRACKING PROCESS USING A ZEOLITE MODIFIED BY BASIC TREATMENT

(71) Applicant: IFP Energies Nouvelles, Rueil Malmaison Cedex (FR)

(72) Inventors: Laurent Simon, Villeurbanne (FR); Emmanuelle Guillon, Vourles (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 13/684,264

(22) Filed: Nov. 23, 2012

(65) Prior Publication Data

US 2013/0090233 A1 Apr. 11, 2013

Related U.S. Application Data

(62) Division of application No. 12/942,351, filed on Nov. 9, 2010, now Pat. No. 8,641,889.

(30) Foreign Application Priority Data

Nov. 10, 2009 (FR) .................................... 09 05404

(51) Int. Cl.
| | |
|---|---|
| *B01J 29/06* | (2006.01) |
| *C01B 39/00* | (2006.01) |
| *B01J 29/08* | (2006.01) |
| *B01J 29/14* | (2006.01) |
| *B01J 29/16* | (2006.01) |
| *B01J 35/10* | (2006.01) |
| *B01J 37/10* | (2006.01) |
| *C10G 45/08* | (2006.01) |
| *C10G 45/12* | (2006.01) |
| *C10G 47/20* | (2006.01) |
| *C10G 65/12* | (2006.01) |
| *B01J 37/20* | (2006.01) |

(52) U.S. Cl.
CPC .............. *C01B 39/00* (2013.01); *B01J 29/084* (2013.01); *B01J 29/146* (2013.01); *B01J 29/166* (2013.01); *B01J 35/10* (2013.01); *B01J 37/10* (2013.01); *C10G 45/08* (2013.01); *C10G 45/12* (2013.01); *C10G 47/20* (2013.01); *C10G 65/12* (2013.01); *B01J 35/1038* (2013.01); *B01J 35/1061* (2013.01); *B01J 37/20* (2013.01); *B01J 2229/16* (2013.01); *B01J 2229/22* (2013.01); *B01J 2229/36* (2013.01); *B01J 2229/38* (2013.01); *B01J 2229/40* (2013.01); *C10G 2300/4018* (2013.01); *C10G 2300/1007* (2013.01); *C10G 2300/107* (2013.01); *C10G 2300/1074* (2013.01); *C10G 2300/1077* (2013.01); *C10G 2400/02* (2013.01); *C10G 2400/04* (2013.01)

USPC ................... 502/79; 502/60; 502/74; 502/85; 502/87

(58) Field of Classification Search
USPC .................................... 502/60, 74, 79, 85, 87
See application file for complete search history.

(56) References Cited

U.S. PATENT DOCUMENTS

| | | | |
|---|---|---|---|
| 3,130,006 A | 4/1964 | Rabo et al. | |
| 4,451,572 A | 5/1984 | Cody | |
| 5,069,890 A * | 12/1991 | Dai et al. ....................... | 423/713 |
| 5,118,482 A * | 6/1992 | Narayana et al. ............. | 423/713 |
| 5,208,197 A | 5/1993 | Vassilakis et al. | |
| 5,601,798 A * | 2/1997 | Cooper et al. ................ | 423/700 |
| 6,420,296 B2 * | 7/2002 | Mignard et al. ................ | 502/79 |
| 7,589,041 B2 * | 9/2009 | Ying et al. ...................... | 502/64 |
| 2009/0118556 A1 | 5/2009 | Euzen et al. | |

FOREIGN PATENT DOCUMENTS

| | | | |
|---|---|---|---|
| FR | 2 793 704 A1 | | 11/2000 |
| WO | WO 2006/070090 A1 | | 7/2006 |

OTHER PUBLICATIONS

Ogura et al., "Formation of Uniform Mesopores in ZSM-5 zeolite through Treatment in Alkaline Soultion", Chemistry Letters, 2000, pp. 882-883.*
Search Report of FR 0905404 (Jul. 6, 2010).
S. Lopes Silva, "Study of Hydrocracking Catalysts Based on Modified USY Zeolites," Internet Citation, XP002586872 (Sep. 30, 2009).

* cited by examiner

*Primary Examiner* — Elizabeth Wood
(74) *Attorney, Agent, or Firm* — Millen, White, Zelano & Branigan, P.C.

(57) ABSTRACT

The present invention describes a hydrocracking and/or hydrotreatment process using a catalyst comprising an active phase containing at least one hydrogenating/dehydrogenating component selected from the group VIB elements and the non-precious elements of group VIII of the periodic table, used alone or in a mixture, and a support comprising at least one dealuminated zeolite Y having an overall initial atomic ratio of silicon to aluminum between 2.5 and 20, an initial weight fraction of extra-lattice aluminum atoms greater than 10%, relative to the total weight of aluminum present in the zeolite, an initial mesopore volume measured by nitrogen porosimetry greater than 0.07 ml·g$^{-1}$ and an initial crystal lattice parameter $a_0$ between 24.38 Å and 24.30 Å, said zeolite being modified by a) a stage of basic treatment comprising mixing said dealuminated zeolite Y with a basic aqueous solution, and at least one stage c) of thermal treatment.

15 Claims, No Drawings

HYDROCRACKING PROCESS USING A ZEOLITE MODIFIED BY BASIC TREATMENT

This application is a divisional application of U.S. patent application Ser. No. 12/942,351, filed on Nov. 9, 2010.

TECHNICAL FIELD

The present invention relates to a process of hydroconversion and in particular a hydrocracking and/or hydrotreatment process using a catalyst comprising an active phase containing at least one hydrogenating/dehydrogenating component selected from the group VIB elements and the non-precious elements of group VIII of the periodic table, used alone or in a mixture, and a support comprising at least one dealuminated zeolite Y having an overall initial atomic ratio of silicon to aluminium between 2.5 and 20, an initial weight fraction of extra-lattice aluminium atoms greater than 10%, relative to the total weight of aluminium present in the zeolite, an initial mesopore volume measured by nitrogen porosimetry greater than $0.07$ ml·g$^{-1}$, and an initial crystal lattice parameter $a_0$, between 24.38 Å and 24.30 Å, said zeolite being modified by a) a stage of basic treatment consisting of mixing said dealuminated zeolite Y with a basic aqueous solution, and at least one stage c) of thermal treatment, said catalyst being a sulphide phase catalyst.

In particular, the invention relates to the hydrocracking of hydrocarbon feeds containing for example aromatic, and/or olefinic, and/or naphthenic, and/or paraffinic compounds apart from feeds originating from the Fischer-Tropsch process and optionally containing metals, and/or nitrogen, and/or oxygen and/or sulphur.

The objective of the hydrocracking process is essentially the production of middle distillates, i.e. a kerosene cut having a boiling point between 150 and 250° C., and a diesel fuel cut having a boiling point between 250 and 380° C.

PRIOR ART

Hydrocracking of heavy petroleum fractions is a very important refining process, which makes it possible to produce, from surplus heavy feeds that are not readily upgradable, lighter fractions such as gasolines, jet fuels and light diesel fuels that the refiner requires for adapting his output to the structure of demand. Certain hydrocracking processes can also give a greatly purified residue, which can provide an excellent base for oils. Relative to catalytic cracking, the advantage of catalytic hydrocracking is that it supplies middle distillates of very good quality. Conversely, the gasoline produced has a much lower octane number than that resulting from catalytic cracking.

Hydrocracking is a process that derives its flexibility from three main elements, namely: the operating conditions used, the types of catalysts used and the fact that the hydrocracking of hydrocarbon feeds can be carried out in one or two stages.

The hydrocracking catalysts used in hydrocracking processes are all of the bifunctional type combining an acid function with a hydrogenating function. The acid function is supplied by supports, the surface areas of which are generally in the range from 150 to 800 m$^2$·g$^{-1}$ and have surface acidity, such as halogenated (in particular chlorinated or fluorinated) aluminas, combinations of oxides of boron and of aluminium, amorphous silica-aluminas and zeolites. The hydrogenating function is supplied either by one or more metals of group VIB of the periodic table of the elements, or by a combination of at least one metal of group VIB of the periodic table and at least one group VIII metal.

The distance between the two functions—acid and hydrogenating—is one of the parameters governing the activity and selectivity of the catalyst. A weak acid function and a strong hydrogenating function give catalysts of low activity, generally working at high temperature (greater than or equal to 390-400° C.), and at a low hourly space velocity (HSV expressed in volume of feed to be treated per unit volume of catalyst and per hour is generally less than or equal to 2), but have very good selectivity for middle distillates (jet fuels and diesel fuels). Conversely, a strong acid function and a weak hydrogenating function give catalysts that are active, but have poorer selectivity for middle distillates.

One type of conventional hydrocracking catalyst is based on amorphous supports that are moderately acidic, such as silica-aluminas for example. These systems are used for producing middle distillates of good quality, and optionally oil bases. These catalysts are for example used in single-stage processes. A drawback of these catalysts based on an amorphous support is their low activity.

For their part, catalysts comprising for example zeolite Y of the structural type FAU display catalytic activity that is greater than that of silica-aluminas, but have lower selectivity for middle distillates (jet fuels and diesel fuels). This difference is attributed to the difference in strength of the acid sites on the two types of materials.

Modification of zeolites by alkaline treatment is a process that has been investigated in the literature that is in the public domain. This process of modification by alkaline treatment makes it possible to create mesoporosity in certain types of zeolites such as microporous zeolite ZSM-5 in Ogura et al., Applied Catal. A: General, 219 (2001) 33, Groen et al., Colloids and surfaces A: Physicochem. Eng. Aspects 241 (2004) 53, and Groen et al., Microporous and Mesoporous Materials, 69 (2004) 29, FER in Groen et al, Microporous and Mesoporous Materials, 69 (2004) 29, MOR in Groen et al., Microporous and Mesoporous Materials, 69 (2004) 29 and Groen et al., J. Catal. 243 (2006) 212 or zeolite BEA, Groen et al., Microporous and Mesoporous Materials, 69 (2004) 29, Groen et al., J. Catal. 243 (2006) 212 and Groen et al., Microporous and Mesoporous Materials, 114 (2008) 93 and the catalysts obtained were used for various catalytic reactions. These studies show that alkaline treatment makes it possible to withdraw silicon atoms from the structure, thus creating mesoporosity. The creation of mesoporosity while maintaining crystallinity and acidic properties of the zeolite are identified in these publications as being connected with the initial overall Si/Al molar ratio of the zeolites, said optimum overall Si/Al ratio having to be between 20 and 50. In fact, outside of this range of overall Si/Al ratio between 20 and 50, and for example for an overall Si/Al ratio less than 20, the structure of the zeolite is very stable owing to the presence of a large number of aluminium atoms, which prevent extraction of silicon atoms and therefore the creation of additional mesoporosity.

BENEFIT OF THE INVENTION

The dealuminated zeolite Y contains mesopores, created by extracting aluminium atoms from the framework of the zeolite. The presence of mesopores makes it possible to improve the selectivity for middle distillates of hydrocracking catalysts using such a zeolite, by facilitating the diffusion of the primary reaction products (jet fuels and diesel fuels) and thus limiting overcracking to light products. However, extraction of aluminium atoms from the framework lowers the Brønsted acidity of said zeolite and therefore its catalytic activity. The gain in selectivity for middle distillates connected with the mesoporosity of the zeolite is therefore obtained at the expense of catalytic activity.

The research carried out by the applicant into the modification of numerous zeolites and crystalline microporous solids and hydrogenating active phases led him to discover that, surprisingly, a catalyst used in a process for hydrocracking and/or hydrotreatment of hydrocarbon feeds comprising an active phase containing at least one hydrogenating/dehydrogenating component selected from the group VIB elements and the non-precious elements of group VIII of the periodic table, used alone or in a mixture, and a support comprising at least one dealuminated zeolite Y and containing a specific weight fraction of extra-lattice aluminium atoms, said zeolite being modified by a) a stage of basic treatment consisting of mixing said dealuminated zeolite Y with a basic aqueous solution making it possible to withdraw silicon atoms from the structure and insert extra-lattice aluminium atoms in the framework of the zeolite, and at least one stage c) of thermal treatment, said catalyst being a sulphide phase catalyst, made it possible to obtain a higher activity, i.e. a higher level of conversion, in hydrocracking and/or in hydrotreatment, and higher selectivity for middle distillates (kerosene and diesel fuels).

Without being bound by any theory, basic treatment of dealuminated zeolite containing a specific initial weight fraction of extra-lattice aluminium atoms permits the creation of mesopores forming a network of interconnected mesopores as far as the surface of the zeolite crystals, by desilication, i.e. by extraction of silicon atoms from the framework of the initial zeolite. The creation of mesoporosity accessible from the external surface of the zeolite crystals, promoting intercrystalline diffusion of molecules, makes it possible for a catalyst using said modified zeolite according to the invention, used in a process for the production of middle distillates, to obtain a higher selectivity for middle distillates. Moreover, basic treatment also permits realumination, i.e. reintroduction of at least a proportion of the extra-lattice aluminium atoms present in the initial zeolite into the framework of the modified zeolite, said realumination making it possible to increase the Brønsted acidity of the modified zeolite, which is reflected, for a catalyst using said modified zeolite according to the invention, in improved catalytic properties, i.e. better conversion.

An objective of the invention is therefore to supply a process for hydrocracking and/or hydrotreatment of hydrocarbon feeds using a catalyst based on a modified zeolite by a basic treatment that makes it possible to achieve a higher degree of conversion as well as better selectivity for middle distillates.

Another objective of the invention is to supply a process for the modification of a dealuminated zeolite Y comprising a) a stage of basic treatment consisting of mixing said dealuminated zeolite Y with a basic aqueous solution, said basic aqueous solution being a solution of basic compounds selected from alkaline bases and strong non-alkaline bases, said stage a) being carried out at a temperature between 40 and 100° C. and for a duration between 5 minutes and 5 h and at least one stage c) of thermal treatment carried out at a temperature between 200 and 700° C.

Another objective of the invention is to supply a catalyst having an active phase comprising at least one hydrogenating/dehydrogenating component selected from the group VIB elements and the non-precious elements of group VIII of the periodic table, used alone or in a mixture, and a support comprising at least one dealuminated zeolite Y having an overall initial atomic ratio of silicon to aluminium between 2.5 and 20, an initial weight fraction of extra-lattice aluminium atoms greater than 10%, relative to the total weight of aluminium present in the zeolite, an initial mesopore volume measured by nitrogen porosimetry greater than 0.07 ml·g$^{-1}$, and an initial crystal lattice parameter $a_0$ between 24.38 Å and 24.30 Å, said zeolite being modified by a modification process comprising a) a stage of basic treatment consisting of mixing said dealuminated zeolite Y with a basic aqueous solution, said basic aqueous solution being a solution of basic compounds selected from alkaline bases and strong non-alkaline bases, said stage a) being carried out at a temperature between 40 and 100° C. and for a duration between 5 minutes and 5 h and at least one stage c) of thermal treatment carried out at a temperature between 200 and 700° C., said catalyst being a sulphide phase catalyst.

DETAILED DESCRIPTION OF THE CATALYST ACCORDING TO THE INVENTION

According to the invention, the process uses a catalyst comprising an active phase comprising at least one hydrogenating/dehydrogenating component selected from the group VIB elements and the non-precious elements of group VIII of the periodic table, used alone or in a mixture, said catalyst being a sulphide phase catalyst.

The Hydrogenating Phase

Preferably, the group VIB elements of the periodic table are selected from the group formed by tungsten and molybdenum, used alone or in a mixture. According to a preferred embodiment, the hydrogenating/dehydrogenating element selected from the group formed by the group VIB elements of the periodic table is molybdenum. According to another preferred embodiment, the hydrogenating/dehydrogenating element selected from the group formed by the group VIB elements of the periodic table is tungsten.

Preferably, the non-precious elements of group VIII of the periodic table are selected from the group formed by cobalt and nickel, used alone or in a mixture. According to a preferred embodiment, the hydrogenating/dehydrogenating element selected from the group formed by non-precious group VIII elements is cobalt. According to another preferred embodiment, the hydrogenating/dehydrogenating element selected from the group formed by non-precious group VIII elements is nickel.

Preferably, said catalyst comprises at least one metal of group VIB in combination with at least one non-precious metal of group VIII, the non-precious group VIII elements being selected from the group formed by cobalt and nickel, used alone or in a mixture, and the group VIB elements being selected from the group formed by tungsten and molybdenum, used alone or in a mixture.

Advantageously, the following combinations of metals are used: nickel-molybdenum, cobalt-molybdenum, nickel-tungsten, cobalt-tungsten, the preferred combinations being: nickel-molybdenum, cobalt-molybdenum, cobalt-tungsten, nickel-tungsten and even more advantageously nickel-molybdenum and nickel-tungsten.

In the case where the catalyst comprises at least one metal of group VIB in combination with at least one non-precious metal of group VIII, the content of metal of group VIB, in oxide equivalent, is advantageously between 5 and 40 wt. % relative to the total weight of said catalyst, preferably between 10 and 35 wt. % and very preferably between 15 and 30 wt. % and the content of non-precious metal of group VIII, in oxide equivalent, is advantageously between 0.5 and 10 wt. % relative to the total weight of said catalyst, preferably between 1 and 8 wt. % and very preferably between 1.5 and 6 wt. %.

It is also possible to use combinations of three metals for example nickel-cobalt-molybdenum, nickel-molybdenum-tungsten, nickel-cobalt-tungsten.

Advantageously, the following combinations of metals are used: nickel-niobium-molybdenum, cobalt-niobium-molybdenum, nickel-niobium-tungsten, cobalt-niobium-tungsten, the preferred combinations being: nickel-niobium-molybdenum, cobalt-niobium-molybdenum. It is also possible to use combinations of four metals, for example nickel-cobalt-niobium-molybdenum.

The catalyst can also advantageously contain:
- from 0 to 20 wt. %, preferably from 0.1 to 15 wt. % and even more preferably 0.1 to 10 wt. %, relative to the total weight of the catalyst, of at least one doping element selected from the group constituted by silicon, boron and phosphorus, not including the silicon contained in the framework of the zeolite and optionally
- from 0 to 60 wt. %, preferably from 0.1 to 50 wt. %, and even more preferably 0.1 to 40 wt. %, relative to the total weight of the catalyst, of at least one element selected from group VB and preferably niobium and also optionally
- from 0 to 20 wt. %, preferably from 0.1 to 15 wt. % and even more preferably 0.1 to 10 wt. % relative to the total weight of the catalyst, of at least one element selected from group VIIA, preferably fluorine.

According to the invention, the catalyst used in the process according to the invention has a support comprising at least one modified zeolite according to the invention and advantageously a porous mineral matrix of the oxide type, said support comprising and preferably being constituted by, preferably:
- 0.1 to 99.8 wt. %, preferably from 0.1 to 80 wt. %, even more preferably 0.1 to 70 wt. %, and very preferably 0.1 to 50 wt. % of modified zeolite according to the invention relative to the total weight of the catalyst,
- 0.2 to 99.9 wt. %, preferably from 20 to 99.9%, more preferably from 30 to 99.9 wt. %, and very preferably from 50 to 99.9 wt. %, relative to the total weight of the catalyst, of at least one porous mineral matrix of the oxide type.

The Zeolite According to the Invention

According to the invention, the zeolite initially used, suitable for the application of the catalyst support used in the process for hydrocracking and/or hydrotreatment of hydrocarbon feeds, is dealuminated zeolite Y (USY) of the structural type FAU.

According to the invention, the dealuminated initial zeolite Y suitable for the application of the catalyst support used in the process for hydrocracking and/or hydrotreatment of hydrocarbon feeds has, before it is modified, an initial overall atomic ratio of silicon to aluminium between 2.5 and 20.0, preferably between 2.6 and 12.0 and more preferably between 2.7 and 10.0, an initial weight fraction of extra-lattice aluminium atoms greater than 10%, preferably greater than 20% and more preferably greater than 30 wt. % relative to the total weight of aluminium present in the zeolite, an initial mesopore volume measured by nitrogen porosimetry greater than 0.07 ml·g$^{-1}$, preferably greater than 0.10 ml·g$^{-1}$, and more preferably greater than 0.13 ml·g$^{-1}$ and an initial crystal lattice parameter $a_0$ between 24.38 Å and 24.30 Å.

Preferably, the dealuminated initial zeolite Y suitable for the application of the catalyst support used in the hydrocracking and/or hydrotreatment process according to the invention has, before it is modified, an initial micropore volume measured by nitrogen porosimetry greater than 0.20 ml·g$^{-1}$, and preferably greater than 0.25 ml·g$^{-1}$.

According to the invention, said dealuminated initial zeolite Y having an overall initial atomic Si/Al ratio between 2.5 and 20.0, preferably between 2.6 and 12.0 and more preferably between 2.7 and 10.0, said overall atomic ratio Si/Al being measured by X-ray fluorescence (XF) and having an initial weight fraction of extra-lattice aluminium atoms measured by NMR of the aluminium that is greater than 10%, preferably greater than 20% and more preferably greater than 30 wt. % relative to the total weight of aluminium present in the zeolite, is obtained by dealumination of a zeolite Y of the structural type FAU by any method of dealumination known to a person skilled in the art.

Production of the Dealuminated Initial Zeolite Y

The zeolite Y of the structural type FAU, which is advantageously in the NaY form after synthesis, can advantageously undergo one or more ion exchanges before undergoing the dealumination stage.

The treatment of dealumination of the zeolite Y of the structural type FAU generally having an overall atomic ratio Si/Al after synthesis between 2.3 and 2.8 can advantageously be carried out by all the methods known to a person skilled in the art. Preferably, dealumination is carried out by a thermal treatment in the presence of steam (also called steaming) and/or by one or more acid attacks advantageously carried out by treatment with an aqueous solution of mineral or organic acid.

Preferably, dealumination is carried out by a thermal treatment followed by one or more acid attacks or only by one or more acid attacks.

Preferably, the thermal treatment in the presence of steam to which the zeolite Y is subjected is carried out at a temperature between 200 and 900° C., preferably between 300 and 900° C., even more preferably between 400 and 750° C. The duration of said thermal treatment is advantageously greater than or equal to 0.5 h, preferably between 0.5 h and 24 h, and very preferably between 1 h and 12 h. The percentage by volume of steam during the thermal treatment is advantageously between 5 and 100%, preferably between 20 and 100%, more preferably between 40% and 100%. The volume fraction other than steam optionally present is formed of air. The gas flow formed of steam and optionally of air is advantageously between 0.2 L/h/g and 10 L/h/g of zeolite Y.

The thermal treatment makes it possible to extract the aluminium atoms from the framework of the zeolite Y while keeping the overall atomic ratio Si/Al of the treated zeolite unchanged. The thermal treatment in the presence of steam is advantageously repeated as many times as necessary to obtain the dealuminated initial zeolite Y suitable for the application of the catalyst support used in the process according to the invention having the desired characteristics and in particular a weight fraction of extra-lattice aluminium atoms representing more than 10 wt. % relative to the total weight of aluminium present in said zeolite. The number of thermal treatments is advantageously less than 4 and preferably a single thermal treatment is carried out, at the end of which the initial weight fraction of extra-lattice aluminium atoms is measured by NMR of the aluminium.

Carrying out the dealumination of the zeolite Y, and to adjust the overall atomic ratio Si/Al of the dealuminated zeolite Y to a value between 2.5 and 20 according to the invention, requires appropriate selection and control of the operating conditions of each stage of acid attack. In particular, the temperature at which the treatment with aqueous solution of mineral or organic acid is carried out, the nature and concentration of the acid used, the ratio of the quantity of acid solution to the weight of zeolite treated, the duration of the treatment by acid attack and the number of treatments carried out are significant parameters for the application of each stage of acid attack.

The acid selected for the application of said stage of acid attack is advantageously either a mineral acid or an organic acid, preferably the acid is a mineral acid selected from nitric acid $HNO_3$, hydrochloric acid HCl and sulphuric acid $H_2SO_4$. Very preferably, the acid is nitric acid. When an organic acid is used for acid attack, acetic acid $CH_3CO_2H$ is preferred. Preferably, the acid attack treatment of zeolite Y with an aqueous solution of a mineral acid or of an organic acid is carried out at a temperature between 30° C. and 120° C., preferably between 50° C. and 120° C., and more preferably between 60 and 100° C. The concentration of acid in the aqueous solution is advantageously between 0.05 and 20 mol·$L^{-1}$, preferably between 0.1 and 10 mol·$L^{-1}$, and more preferably between 0.5 and 5 mol·$L^{-1}$. The ratio of the volume of acid solution V in ml to the weight W of zeolite Y treated in grams is advantageously between 1 and 50, and preferably between 2 and 20. The duration of acid attack is advantageously greater than 1 h, preferably between 2 h and 10 h, and more preferably between 2 h and 8 h. The number of successive treatments of acid attack of zeolite Y with an aqueous acid solution is advantageously less than 4. In the case where several successive treatments of acid attack are carried out, aqueous solutions of mineral or organic acid with different concentrations of acid can be used.

In order to adjust the overall atomic ratio Si/Al of dealuminated zeolite Y to a value between 2.5 and 20, said ratio is measured by X-ray fluorescence at the end of each acid attack treatment that is carried out.

After carrying out the acid attack treatment(s), the zeolite is then advantageously washed with distilled water and is then dried at a temperature between 80 and 140° C. for a duration between 10 and 48 h.

The treatment by acid attack makes it possible both to extract aluminium atoms from the framework and extract the aluminium atoms from the pores of the zeolitic solid. Thus, the overall atomic ratio Si/Al of the dealuminated zeolite Y obtained increases to a value between 2.5 and 20, said zeolite being suitable for the application of the catalyst support used in the process according to the invention.

Moreover, said dealuminated initial zeolite Y obtained, and suitable for the application of the catalyst support used in the process according to the invention, has after dealumination an initial mesopore volume measured by nitrogen porosimetry greater than 0.07 ml·$g^{-1}$, preferably greater than 0.10 ml·$g^{-1}$ and preferably greater than 0.13 ml·$g^{-1}$, the creation of mesoporosity resulting from extraction of aluminium atoms out of the pores of the zeolite solid and an initial crystal lattice parameter $a_0$ between 24.38 Å and 24.30 Å.

Said dealuminated initial zeolite Y obtained advantageously also has an initial micropore volume measured by nitrogen porosimetry greater than 0.20 ml·$g^{-1}$, and preferably greater than 0.25 ml·$g^{-1}$.

The micropore and mesopore volumes of the dealuminated zeolite Y are measured by adsorption/desorption of nitrogen and the lattice constant of the zeolite is measured by X-ray diffraction (XRD).

Another object of the present invention is a process for modifying a dealuminated zeolite Y comprising a) a stage of basic treatment consisting of mixing said dealuminated zeolite Y with a basic aqueous solution, said basic aqueous solution being a solution of basic compounds selected from alkaline bases and strong non-alkaline bases, said stage a) being carried out at a temperature between 40 and 100° C. and for a duration between 5 minutes and 5 h and at least one stage c) of thermal treatment carried out at a temperature between 200 and 700° C.

Process for Modifying the Dealuminated Initial Zeolite Y According to the Invention In accordance with the invention, the dealuminated initial zeolite Y suitable for the application of the catalyst support used in the process according to the invention is modified by a specific modifying process comprising a) a stage of basic treatment consisting of mixing said dealuminated zeolite Y with a basic aqueous solution, said basic aqueous solution being a solution of basic compounds selected from alkaline bases and strong non-alkaline bases, said stage a) being carried out at a temperature between 40 and 100° C. and for a duration between 5 minutes and 5 h and at least one stage c) of thermal treatment carried out at a temperature between 200 and 700° C.

Stage a) of basic treatment makes it possible to withdraw silicon atoms from the structure and insert extra-lattice aluminium atoms in the framework.

According to the invention, the process for modifying said dealuminated initial zeolite Y comprises a stage a) of basic treatment consisting of mixing said dealuminated zeolite USY with a basic aqueous solution, said basic aqueous solution being a solution of basic compounds selected from alkaline bases and strong non-alkaline bases, said stage a) being carried out at a temperature between 40 and 100° C. and for a duration between 5 minutes and 5 h.

The basic compounds selected from alkaline bases are preferably selected from alkali metal carbonates and alkali metal hydroxides, the alkaline cations of alkali metal carbonates and of alkali metal hydroxides belonging advantageously to groups IA or IIA of the periodic table and the strong non-alkaline bases are preferably selected from quaternary ammoniums used alone or in a mixture, and preferably the non-alkaline strong base is tetramethylammonium hydroxide.

Said alkaline cations of alkali metal carbonates and of alkali metal hydroxides belonging advantageously to groups IA or IIA of the periodic table are preferably selected from the cations $Na^+$, $Li^+$, $K^+$, $Rb^+$, $Cs^+$, $Ba^{2+}$ and $Ca^{2+}$ and very preferably said cation is the cation $Na^+$ or $K^+$.

Preferably, the aqueous solution is a solution of sodium carbonate or sodium hydroxide and more preferably the aqueous solution is a solution of sodium hydroxide.

Said basic aqueous solution has a concentration between 0.001 mol/L and 12 mol/L, preferably a concentration between 0.005 mol/L and 11 mol/L and even more preferably a concentration between 0.01 mol/L and 9 mol/L.

According to the invention, stage a) of basic treatment of the process for modifying said dealuminated initial zeolite USY is carried out under temperature conditions between 40 and 100° C. (reflux) and preferably between 40 and 90° C. and for a duration between 5 min and 5 h, preferably between 15 min and 4 h and even more preferably between 15 min and 3 h.

On completion of the basic treatment of said zeolite, the solution is cooled rapidly to ambient temperature and then said zeolite is separated from the liquid by any technique known to a person skilled in the art. The separation can be carried out by filtration or by centrifugation, and preferably by centrifugation. The modified zeolite USY obtained is then washed with distilled water at a temperature between 20 and 100° C. and preferably at a temperature between 40 and 80° C. and very preferably at 50° C. and is dried at a temperature between 80 and 150° C. and preferably between 100 and 130° C. and very preferably at 120° C.

In the case where stage a) of basic treatment consists of mixing said dealuminated initial zeolite Y with a basic aqueous solution of compounds selected from alkaline bases, the zeolite contained in the catalyst support used in the process according to the invention contains, at the end of stage a) of the modification process, a partial or complete fraction of alkaline ions in the cationic position.

In the case where stage a) of basic treatment consists of mixing said dealuminated initial zeolite Y with a basic aqueous solution of compounds selected from non-alkaline bases, the zeolite contained in the catalyst support used in the process according to the invention contains, at the end of stage a) of the modification process, a partial or complete fraction of quaternary ammonium ions in the cationic position.

During stage a) of basic treatment of the process for modifying the dealuminated initial zeolite Y according to the invention, a proportion of the silicon atoms contained in the framework of said zeolite are extracted, a phenomenon called desilication, creating voids in the structure and the formation of mesoporosity and/or permitting reinsertion of at least a proportion of the fraction of extra-lattice aluminium atoms present in said dealuminated initial zeolite Y, in place of the silicon atoms extracted by desilication and thus permitting the formation of new Brønsted acid sites. This second phenomenon is called re-alumination.

In the case where stage a) of basic treatment consists of mixing said dealuminated initial zeolite USY with a basic aqueous solution of basic compounds selected from alkaline bases and preferably selected from alkali metal carbonates and alkali metal hydroxides and very preferably with a solution of sodium hydroxide (NaOH), the process for modifying said dealuminated initial zeolite USY advantageously includes a stage b) of at least one partial or complete exchange of said alkaline cations belonging to groups IA and IIA of the periodic table introduced during stage a) and present in the cationic position, with $NH_4^+$ cations and preferably $Na^+$ cations with $NH_4^+$ cations.

Partial or complete exchange of the alkaline cations with $NH_4^+$ cations means exchange from 80 to 100%, preferably 85 to 99.5% and more preferably 88 to 99%, of said alkaline cations with $NH_4^+$ cations. The quantity of alkaline cations remaining and preferably the quantity of $Na^+$ cations remaining in the modified zeolite, relative to the quantity of $NH_4^+$ cations initially present in the zeolite is, at the end of stage b), advantageously between 0 and 20%, preferably between 0.5 and 15% and preferably between 1 and 12%.

Preferably, for this stage, several ion exchange(s) are carried out with a solution containing at least one ammonium salt selected from the ammonium chlorate, sulphate, nitrate, phosphate, or acetate salts, so as to remove, at least partly, the alkaline cations and preferably $Na^+$ cations present in the zeolite. Preferably, the ammonium salt is ammonium nitrate $NH_4NO_3$.

Thus, the content of alkaline cations remaining and preferably of $Na^+$ cations in the modified zeolite at the end of stage b) is preferably such that the molar ratio of alkaline cation to aluminium and preferably the Na/Al molar ratio is between 0.2:1 and 0:1, preferably between 0.15:1 and 0.005:1, and more preferably between 0.12:1 and 0.01:1.

The desired Na/Al ratio is obtained by adjusting the $NH_4^+$ concentration of the cation exchange solution, the temperature of cation exchange and the cation exchange number. The concentration of $NH_4^+$ in the solution varies advantageously between 0.01 and 12 mol/L, and preferably between 1 and 10 mol/L. The temperature of the exchange stage is advantageously between 20 and 100° C., preferably between 60 and 95° C., preferably between 60 and 90° C., more preferably between 60 and 85° C. and even more preferably between 60 and 80° C. The cation exchange number varies advantageously between 1 and 10 and preferably between 1 and 4.

In the case where stage a) of basic treatment consists of mixing said dealuminated initial zeolite USY with an aqueous solution of basic compounds selected from strong non-alkaline bases preferably selected from quaternary ammoniums used alone or in a mixture and preferably the non-alkaline strong base being tetramethylammonium hydroxide, the modified zeolite obtained from stage a) contains a partial or complete fraction of quaternary ammonium ions in the cationic position.

In this case, the process for modifying said dealuminated initial zeolite USY advantageously does not include stage b) of at least one partial or complete intermediate exchange, and the modified zeolite obtained from stage a) directly undergoes stage c) of thermal treatment.

According to the invention, the process for modifying the dealuminated initial zeolite Y then has at least one stage c) of thermal treatment.

In the case where stage a) of basic treatment consists of mixing said dealuminated initial zeolite USY with a basic aqueous solution of compounds selected from alkaline bases and preferably selected from alkali metal carbonates and alkali metal hydroxides and very preferably with a solution of sodium hydroxide (NaOH), stage c) of thermal treatment permits, at the same time, drying and the conversion of the $Na_4^+$ cations exchanged during stage b) to protons.

In the case where stage a) of basic treatment consists of mixing said dealuminated initial zeolite USY with a basic aqueous solution of compounds selected from strong non-alkaline bases and preferably selected from quaternary ammoniums used alone or in a mixture and preferably the non-alkaline strong base being tetramethylammonium hydroxide, stage c) of thermal treatment permits, at the same time, drying and the decomposition of the ammonium quaternary cations in the position of counter-ions and the formation of protons.

In all cases, at the end of said stage c) of thermal treatment, the protons of the zeolite are partially or completely regenerated.

Stage c) of thermal treatment according to the invention is carried out at a temperature between 200 and 700° C., and preferably between 300 and 500° C. Said stage of thermal treatment is advantageously implemented under air, under oxygen, under hydrogen, under nitrogen or under argon or under a mixture of nitrogen and argon. The duration of said treatment is advantageously between 1 and 5 hours.

Another object of the present invention is a modified dealuminated zeolite Y obtained by the process for modifying according to the invention.

At the end of the process of modification according to the invention, the final modified zeolite implemented in the catalyst support used in the process according to the invention advantageously has a final mesopore volume measured by nitrogen porosimetry at least 10% greater relative to the initial mesopore volume and preferably at least 20% greater relative to the initial mesopore volume of the dealuminated initial zeolite USY, a final micropore volume measured by nitrogen porosimetry that must not decrease by more than 40%, preferably by more than 30% and preferably by more than 20% relative to the initial micropore volume of said dealuminated initial zeolite USY, a Brønsted acidity more than 10% higher and preferably more than 20% higher relative to the Brønsted acidity of the dealuminated initial zeolite Y and a final crystal lattice parameter $a_0$ greater than the initial crystal lattice parameter $a_0$) of the dealuminated initial zeolite Y.

At the end of the process for modifying the dealuminated zeolite Y according to the invention, the significant increase in the mesopore volume of the resultant modified zeolite and maintenance of a significant micropore volume relative to the dealuminated initial zeolite Y reflect the creation of additional mesoporosity by desilication.

Moreover, the increase in the Brønsted acidity of the final modified zeolite relative to the dealuminated initial zeolite Y is evidence of the reintroduction of the extra-lattice aluminium atoms into the framework of the zeolite, i.e. the phenomenon of realumination.

The Amorphous or Poorly Crystallized Porous Mineral Matrix of the Oxide Type

The catalyst support used in the hydrocracking and/or hydrotreatment process according to the invention advantageously contains a porous mineral matrix, preferably amorphous, which is advantageously constituted by at least one refractory oxide. Said matrix is advantageously selected from the group comprising alumina, silica, clays, titanium dioxide, boron oxide and zirconia, used alone or in a mixture. The matrix can be constituted by a mixture of at least two of the aforementioned oxides, and preferably silica-alumina. Aluminates can also be selected. It is preferable to use matrices containing alumina, in all its forms known to a person skilled in the art, for example gamma alumina.

Mixtures of alumina and silica, and mixtures of alumina and silica-alumina can also be used advantageously.

Characterization Techniques

The overall Si/Al atomic ratio of the dealuminated initial and final zeolite Y, i.e. after modification, is measured by X-ray fluorescence. X-ray fluorescence is a technique for overall elementary analysis which permits analysis of all the elements of the periodic table starting from boron. It is possible to determine from a few ppm up to 100%. In this invention, this technique is used for determining the silicon and aluminium in the zeolites (as percentage by weight) and thus makes it possible to calculate the Si/Al atomic ratio.

The weight fraction of tetracoordinated and hexacoordinated aluminium atoms present in the modified zeolite USY is determined by nuclear magnetic resonance of solid $^{27}Al$. The use of NMR of aluminium is in fact known for detecting and quantifying the various coordination states of this nucleus ("Analyse physico-chimique des catalyseurs industriels", J. Lynch, Editions Technip (2001) chap. 13, pages 290 and 291). The NMR spectrum of the aluminium in the initial zeolite USY and in the modified zeolite USY according to the invention has two signals, one being characteristic of the resonance of the tetracoordinated aluminium atoms (i.e. of the aluminium atoms comprised in the crystal lattice of the zeolite) and the other being characteristic of the resonance of the hexacoordinated aluminium atoms (i.e. of the aluminium atoms outside of the crystal lattice or extra-lattice aluminium atoms). The tetracoordinated aluminium atoms $Al_{IV}$ resonate at a chemical shift between +40 ppm and +75 ppm and the hexacoordinated or extra-lattice aluminium atoms $Al_{VI}$ resonate at a chemical shift between −15 ppm and +15 ppm. The weight fraction of the two aluminium species $Al_{IV}$ and $Al_{VI}$ is quantified by integration of the signals corresponding to each of these species.

More precisely, the modified zeolite USY according to the invention contained in the catalyst support according to the invention was analysed by NMR-MAS of solid $^{27}Al$ on a Brücker spectrometer of the type Avance 400 MHz by means of a 4 mm probe optimized for $^{27}Al$. The speed of rotation of the sample is close to 14 kHz. The aluminium atom is a quadrupole nucleus with spin of 5/2. Under so-called selective conditions of analysis, namely a field of low radiofrequency equal to 30 kHz, a low pulse angle equal to π/2 and in the presence of a water-saturated sample, the technique of NMR with magic angle spinning (MAS), designated NMR-MAS, is a quantitative technique. Analysis of each NMR-MAS spectrum gives directly the quantity of different aluminium species, namely of tetracoordinated aluminium atoms $Al_{IV}$ and of hexacoordinated or extra-lattice aluminium atoms $Al_{VI}$. Each spectrum is adjusted in chemical shift relative to a 1M solution of aluminium nitrate, for which the signal from aluminium is at zero ppm. The signals characterizing the tetracoordinated aluminium atoms $Al_{IV}$ are integrated between +40 ppm and +75 ppm, which corresponds to area 1, and the signals characterizing the hexacoordinated aluminium atoms $Al_{VI}$ are integrated between −15 ppm and +15 ppm, which corresponds to area 2. The weight fraction of hexacoordinated aluminium atoms $Al_{VI}$ is equal to the ratio area 2/(area 1+ area 2).

The crystal lattice parameter $a_0$ of the dealuminated initial and final zeolites Y, i.e. after modification, is measured by X-ray diffraction (XRD). For zeolite Y of type FAU, the lattice parameter $a_0$ is calculated from the positions of the peaks corresponding to the Miller indices 533, 642 and 555 ("Théorie et technique de la radiocristallographie", A. Guinier, publ. Dunod, 1964). As the length of the Al—O bond is greater than that of the Si—O bond, the parameter $a_0$ increases with increasing number of aluminium atoms in the tetrahedral position in the zeolite framework. For crystals constituted by cubic lattices such as zeolites Y of type FAU, there is a linear relation between the lattice parameter $a_0$ and the Si/Al ratio ("Hydrocracking Science and Technology", J. Scherzer, A. J. Gruia, Marcel Dekker Inc., 1996)

The micropore and mesopore volumes of the dealuminated initial and final zeolite Y are measured by adsorption/desorption of nitrogen. Analysis of the curves of nitrogen adsorption isotherms of microporous and mesoporous solids makes it possible to calculate the pore volumes by the so-called volumetric technique. Various types of models can be used. The pore distribution measured by adsorption of nitrogen was determined by the Barrett-Joyner-Halenda (B J H) model. The nitrogen adsorption-desorption isotherm according to the B J H model is described in the article in "The Journal of American Society", 73, 373, (1951) by E. P. Barrett, L. G. Joyner and P. P. Halenda. Hereinafter, nitrogen adsorption volume means the volume measured for $P/P_0=0.95$. The micropore volume is obtained by the "t-plot" method or by measuring the volume adsorbed at P/PO=0.35 (P=adsorption pressure; PO=saturated vapour pressure of the adsorbate at the test temperature). The mesopore volume is obtained by subtracting the micropore volume from the total pore volume.

The Lewis and Brønsted acidity of the zeolites is measured by adsorption of pyridine followed by infrared spectroscopy (FTIR). Integration of the characteristic bands of pyridine coordinated at 1455 $cm^{-1}$ and of pyridine protonated at 1545 $cm^{-1}$ makes it possible to compare the relative acidity of catalysts of the Lewis and Brønsted type, respectively. Prior to adsorption of pyridine, the zeolite is pretreated under high vacuum at 450° C. for 10 h with an intermediate plateau at 150° C. for 1 h. The pyridine is then adsorbed at 150° C. and then desorbed under high vacuum at this same temperature before recording the spectra.

Preparation of the Catalyst

The modified zeolite can be, without this being limitative, for example in the form of powder, finely-ground powder, suspension, or suspension that has undergone a deagglomeration treatment. Thus, for example, the modified zeolite can advantageously be prepared as a suspension, acidified or not, at a concentration adjusted to the intended final zeolite content on the support. This suspension, commonly called a slurry, is then advantageously mixed with the matrix precursors.

According to a preferred manner of preparation, the modified zeolite can advantageously be introduced during forming of the support with the matrix constituents. For example, according to this preferred embodiment of the present invention, the modified zeolite according to the invention is added to a wet alumina gel during the stage of forming of the support.

One of the preferred methods of forming of the support in the present invention consists of mixing at least one modified zeolite with a wet alumina gel for some tens of minutes, then passing the paste thus obtained through a die to form extrudates with a diameter between 0.4 and 4 mm.

According to another preferred manner of preparation, the modified zeolite can be introduced during synthesis of the matrix. For example, according to this preferred embodiment of the present invention, the modified zeolite is added during synthesis of the silica-alumina matrix; the zeolite can be added to a mixture composed of an alumina compound in an acid medium with a completely soluble silica compound.

The support can be formed by any technique known to a person skilled in the art. Forming can be carried out for example by extrusion, by pelletization, by the oil-drop method, by rotating plate granulation or by any other method well known to a person skilled in the art.

At least one calcination can be carried out after any one of the preparation stages. The calcination treatment is usually carried out under air at a temperature of at least 150° C., preferably at least 300° C., more preferably between about 350 and 1000° C.

The group VIB elements and/or the non-precious group VIII elements and optionally doping elements selected from phosphorus, boron, silicon and optionally elements of groups VB and VIIB can optionally be introduced, wholly or partly, at any stage of preparation, during synthesis of the matrix, preferably during forming of the support, or very preferably after forming of the support by any method known to a person skilled in the art. They can be introduced after forming of the support, either after or before drying and calcination of the support.

According to a preferred embodiment of the present invention, some or all of the elements of groups VIB and/or non-precious group VIII elements, and optionally doping elements selected from phosphorus, boron, silicon and optionally elements of groups VB and VIIB can be introduced during forming of the support, for example during the stage of mixing of the modified zeolite with a wet alumina gel.

According to another preferred embodiment of the present invention, some or all of the elements of groups VIB and/or of non-precious group VIII elements and optionally those selected from phosphorus, boron, silicon and optionally elements of groups VB and VIIA can be introduced by one or more operations of impregnation of the formed and calcined support, with a solution containing the precursors of said elements. Preferably, the support is impregnated with an aqueous solution. The impregnation of the support is preferably carried out by the so-called "dry" method of impregnation that is well known to a person skilled in the art.

In the case where the catalyst of the present invention contains a non-precious metal of group VIII, the group VIII metals are preferably introduced by one or more operations of impregnation of the formed and calcined support, after those of group VIB or at the same time as the latter.

According to another preferred embodiment of the present invention, deposition of boron and silicon can also be carried out simultaneously using for example a solution containing a boron salt and a silicon compound of the silicone type.

Impregnation of the element or elements of group VB and preferably of niobium can be facilitated by adding oxalic acid and optionally ammonium oxalate in the solutions of niobium oxalate. Other compounds can be used for improving the solubility and facilitating the impregnation of niobium, as is well known to a person skilled in the art.

When at least one doping element, P and/or B and/or Si, is introduced, its distribution and its localization can be determined by techniques such as the Castaing microprobe (distribution profile of the various elements), transmission electron microscopy coupled with EDX analysis (energy-dispersion X-ray analysis) of the catalyst components, or by mapping the distribution of the elements present in the catalyst by electron microprobe.

For example, among the sources of molybdenum and of tungsten, it is possible to use oxides and hydroxides, molybdic and tungstic acids and their salts in particular the ammonium salts such as ammonium molybdate, ammonium heptamolybdate, ammonium tungstate, phosphomolybdic acid, phosphotungstic acid and their salts, silicomolybdic acid, silicotungstic acid and their salts. Oxides and ammonium salts such as ammonium molybdate, ammonium heptamolybdate and ammonium tungstate are preferably used.

The sources of non-precious group VIII elements that can be used are well known to a person skilled in the art. For example, for the base metals, the nitrates, sulphates, hydroxides, phosphates, halides for example chlorides, bromides and fluorides, carboxylates for example acetates and carbonates, will be used.

The preferred source of phosphorus is orthophosphoric acid $H_3PO_4$, but its salts and esters such as ammonium phosphates are also suitable. Phosphorus can for example be introduced in the form of a mixture of phosphoric acid and a basic organic compound containing nitrogen such as ammonia, primary and secondary amines, cyclic amines, the compounds of the pyridine family and quinolines and the compounds of the pyrrole family. Tungsto-phosphoric or tungsto-molybdic acids can be used.

The phosphorus content is adjusted, without limiting the scope of the invention, so as to form a mixed compound in solution and/or on the support, for example tungsten-phosphorus or molybdenum-tungsten-phosphorus. These mixed compounds can be heteropolyanions. These compounds can be Anderson heteropolyanions, for example.

The source of boron can be boric acid, preferably orthoboric acid $H_3BO_3$, ammonium diborate or pentaborate, boron oxide, boric esters. Boron can for example be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family. Boron can be introduced for example with a solution of boric acid in a water/alcohol mixture.

Numerous sources of silicon can be used. Thus, it is possible to use ethyl orthosilicate $Si(OEt)_4$, siloxanes, polysiloxanes, silicones, emulsions of silicones, silicates of halides such as ammonium fluorosilicate $(NH_4)_2SiF_6$ or sodium fluorosilicate $Na_2SiF_6$. Silicomolybdic acid and its salts, and silicotungstic acid and its salts can also be used advantageously. Silicon can be added for example by the impregnation of ethyl silicate in solution in a water/alcohol mixture. Silicon can be added for example by the impregnation of a silicon compound of the silicone type or silicic acid suspended in water.

The sources of group VB element that can be used are well known to a person skilled in the art. For example, among the sources of niobium, it is possible to use oxides, such as diniobium pentoxide $Nb_2O_5$, niobic acid $Nb_2O_5 \cdot H_2O$, niobium hydroxides and polyoxoniobates, niobium alkoxides of formula $Nb(OR1)_3$ where R1 is an alkyl radical, niobium oxalate $NbO(HC_2O_4)_5$, ammonium niobate. Niobium oxalate or ammonium niobate is preferably used.

The sources of group VIIA elements that can be used are well known to a person skilled in the art. For example, fluoride anions can be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid. It is also possible to use hydrolysable compounds, which can release fluoride anions in water, such as ammonium fluorosilicate $(NH_4)_2SiF_6$, silicon tetrafluoride $SiF_4$ or sodium tetrafluoride $Na_2SiF_6$. Fluorine can be introduced for example by the impregnation of an aqueous solution of hydrofluoric acid or of ammonium fluoride.

The catalysts used in the process according to the invention are advantageously in the form of spheres or extrudates. It is however advantageous for the catalyst to be in the form of extrudates with a diameter between 0.5 and 5 mm and more particularly between 0.7 and 2.5 mm. The shapes are cylindrical (which can be hollow or solid), cylindrical twisted, multilobed (2, 3, 4 or 5 lobes for example), rings. The cylindrical shape is preferably used, but any other shape can be used. The catalysts according to the invention can optionally be manufactured and used in the form of crushed powder, pellets, rings, beads, or wheels.

According to the invention, the metals of group VIB and/or non-precious metals of group VIII of said catalyst are present in the form of sulphide, the sulphurization treatment being described later.

The invention also relates to a process for hydrocracking and/or hydrotreatment of hydrocarbon feeds using the catalyst described above.

Hydrocracking and Hydrotreatment Processes

The invention relates to a hydrocracking and/or hydrotreatment process operating in the presence of hydrogen, at a temperature greater than 200° C., at a pressure greater than 1 MPa, the space velocity being between 0.1 and 20 $h^{-1}$ and the quantity of hydrogen introduced is such that the volume ratio liter of hydrogen/liter of hydrocarbon is between 80 and 5000 L/L.

More particularly, the invention relates to a process of hydroconversion and in particular of hydrocracking as well as to a process of hydrotreatment of hydrocarbon feeds using the catalyst described above.

Preferably, the hydrocracking process according to the invention operates in the presence of hydrogen, at a temperature greater than 200° C., preferably between 250 and 480° C., preferably between 320 and 450° C., very preferably between 330 and 435° C., at a pressure greater than 1 MPa, preferably between 2 and 25 MPa, more preferably between 3 and 20 MPa, at a space velocity between 0.1 and 20 $h^{-1}$, preferably 0.1 and 6 $h^{-1}$, preferably between 0.2 and 3 $h^{-1}$, and the quantity of hydrogen introduced is such that the volume ratio liter of hydrogen/liter of hydrocarbon is between 80 and 5000 L/L and generally between 100 and 2000 L/L.

These operating conditions used in the processes according to the invention generally make it possible to reach conversions per pass, to products having boiling points less than 340° C., and preferably less than 370° C., greater than 15 wt. % and even more preferably between 20 and 95 wt. %.

The invention also relates to a process of hydrotreatment of hydrocarbon feeds using the catalyst described above, and said process of hydrotreatment can advantageously be installed alone or upstream of a hydrocracking process. Said hydrotreatment process is described later.

Feeds

Very varied feeds can be treated by the processes according to the invention described above. Advantageously they contain at least 20 vol. % and preferably at least 80 vol. % of compounds boiling greater than 340° C.

The feed is advantageously selected from LCO (Light Cycle Oil=light diesel fuels obtained from a catalytic cracking unit), atmospheric distillates, vacuum distillates such as for example gas oils from direct distillation of crude or from conversion units such as FCC, coking or visbreaking units, feeds obtained from units for extracting aromatics from bases of lubricating oil or obtained from solvent dewaxing of bases of lubricating oil, distillates from fixed-bed or ebullating-bed processes of desulphurization or hydroconversion of AR (atmospheric residues) and/or of VR (vacuum residues) and/or of deasphalted oils, and the deasphalted oils, used alone or in a mixture. The above is not an exhaustive list. The paraffins resulting from the Fischer-Tropsch process are excluded. Said feeds preferably have a boiling point T5 greater than 340° C., preferably greater than 370° C., i.e. 95% of the compounds present in the feed have a boiling point greater than 340° C., and preferably greater than 370° C.

The nitrogen content of the feeds treated in the processes according to the invention is advantageously greater than 500 ppm by weight, preferably between 500 and 10000 ppm by weight, more preferably between 700 and 4000 ppm by weight and even more preferably between 1000 and 4000 ppm by weight. The sulphur content of the feeds treated in the processes according to the invention is advantageously between 0.01 and 5 wt. %, preferably between 0.2 and 4 wt. % and even more preferably between 0.5 and 3 wt. %.

The feed can optionally contain metals. The cumulative content of nickel and vanadium in the feeds treated in the processes according to the invention is preferably less than 1 ppm by weight.

The feed can optionally contain asphaltenes. The content of asphaltenes is generally less than 3000 ppm by weight, preferably less than 1000 ppm by weight, even more preferably less than 200 ppm by weight.

Sulphurization of the Catalysts

According to the invention, prior to injection of the feed, the catalysts used in the processes according to the present invention are subjected beforehand to a sulphurization treatment for converting, at least partly, the metallic species to sulphide before bringing them into contact with the feed to be treated. This treatment of activation by sulphurization is well known to a person skilled in the art and can be carried out by any method already described in the literature either in-situ, i.e. in the reactor, or ex-situ.

A conventional method of sulphurization that is well known to a person skilled in the art consists of heating the catalyst in the presence of hydrogen sulphide (pure or for example under a stream of a hydrogen/hydrogen sulphide mixture) at a temperature between 150 and 800° C., preferably between 250 and 600° C., generally in a traversed-bed reaction zone.

Guard Beds

In the case where the feed contains compounds of the resin and/or asphaltene type, it is advantageous for the feed to be passed first over a bed of catalyst or of adsorbent different from the hydrocracking or hydrotreatment catalyst. The guard catalysts or beds used according to the invention are in the form of spheres or extrudates. It is however advantageous for the catalyst to be in the form of extrudates with a diameter between 0.5 and 5 mm and more particularly between 0.7 and 2.5 mm. The shapes are cylindrical (which can be hollow or solid), cylindrical twisted, multilobed (2, 3, 4 or 5 lobes for example), or rings. The cylindrical shape is preferably used, but any other shape can be used.

In order to remedy the presence of contaminants and/or poisons in the feed, guard catalysts can, in another preferred embodiment, have more particular geometric shapes in order to increase their voids fraction. The voids fraction of these catalysts is between 0.2 and 0.75. Their outside diameter can vary between 1 and 35 mm. Among the possible particular shapes, without this list being exhaustive, there may be mentioned: hollow cylinders, hollow rings, Raschig rings, notched hollow cylinders, indented hollow cylinders, pentaring cartwheels, cylinders with multiple holes, etc.

These guard catalysts or beds can have been impregnated with an active or inactive phase. Preferably, the catalysts are impregnated with a hydrogenating-dehydrogenating phase. Very preferably, the phase CoMo or NiMo is used.

These guard catalysts or beds can have macroporosity. The guard beds can be those marketed by Norton-Saint-Gobain, for example the MacroTrap® guard beds. The guard beds can be those marketed by Axens in the ACT family: ACT077, ACT645, ACT961 or HMC841, HMC845, HMC868 or HMC945. It can be particularly advantageous to superpose these catalysts in at least two different beds with variable heights. The catalysts with the highest voids fraction are preferably used in the first catalyst bed(s) at the entrance of the catalytic reactor. It can also be advantageous to use at least two different reactors for these catalysts.

The guard beds that are preferred according to the invention are the HMCs and ACT961.

EMBODIMENTS

The hydrocracking processes according to the invention using the catalysts described above cover the ranges of pressure and conversion from mild hydrocracking to high-pressure hydrocracking. By "mild hydrocracking" is meant hydrocracking leading to moderate conversions, generally less than 40%, and operating at low pressure, generally between 2 MPa and 6 MPa.

The hydrocracking processes according to the invention can advantageously use said catalyst described above alone, in one or more fixed-bed catalyst beds, in one or more reactors, in a hydrocracking scheme called single-stage, with or without liquid recycling of the unconverted fraction, optionally in combination with a conventional hydrotreatment catalyst located upstream of the catalyst used in the process according to the present invention.

The hydrocracking processes according to the invention can advantageously also use said catalyst described above alone, in one or more ebullating bed reactors, in a hydrocracking scheme called single-stage, with or without liquid recycling of the unconverted fraction, optionally in combination with a conventional hydrotreatment catalyst located in a fixed-bed or ebullating-bed reactor upstream of the catalyst used in the process according to the present invention.

The ebullating bed operates with withdrawal of spent catalyst and daily addition of fresh catalyst in order to maintain stable catalyst activity.

The catalyst described according to the invention can also advantageously be used in the first hydrotreatment reaction zone, in converting pretreatment, alone or in combination with another conventional hydrorefining catalyst, located upstream of the catalyst described according to the invention, in one or more catalyst bed(s), in one or more fixed-bed or ebullating-bed reactor(s).

The So-Called Single-Stage Process

The hydrocracking process according to the invention can advantageously be used in a so-called single-stage process.

So-called single-stage hydrocracking comprises firstly and generally a severe hydrorefining which has the purpose of carrying out a severe hydrodenitrogenation and desulphurization of the feed before the latter is sent over the hydrocracking catalyst proper, particularly in the case where the latter comprises a zeolite. This severe hydrorefining of the feed only results in limited conversion of the feed, to lighter fractions, which is still insufficient and must therefore be completed on the more active hydrocracking catalyst described above. However, it is to be noted that no separation occurs between the two types of catalysts. All of the effluent leaving the reactor is injected onto the hydrocracking catalyst proper, and it is only thereafter that the products formed are separated. This version of hydrocracking, also called "Once Through", includes a variant with recycling of the unconverted fraction to the reactor for deeper conversion of the feed.

The catalyst described according to the invention is therefore advantageously used in a single-stage hydrocracking process, in a hydrocracking zone located downstream of a hydrorefining zone, without applying any intermediate separation between the two zones.

Preferably, the hydrorefining catalyst used in the first hydrorefining reaction zone, alone or in combination with another conventional hydrorefining catalyst, located upstream of the catalyst described according to the invention, is a catalyst optionally comprising a doping element selected from phosphorus, boron and silicon, said catalyst being based on non-precious group VIII elements and optionally in combination with group VIB elements on an alumina or silica-alumina support and even more preferably said catalyst comprises nickel and tungsten.

The catalyst described according to the invention can also be used advantageously in the first hydrorefining reaction zone, in converting pretreatment, alone or in combination with another conventional hydrorefining catalyst, located upstream of the catalyst described according to the invention, in one or more catalyst bed(s), in one or more reactor(s).

So-Called Single-Stage Fixed-Bed Process with Intermediate Separation

The hydrocracking process according to the invention can advantageously be implemented in a so-called single-stage fixed-bed process with intermediate separation.

Said process advantageously comprises a hydrorefining zone, a zone permitting partial removal of ammonia, for example by hot flash, and a zone comprising said hydrocracking catalyst according to the invention. This process for single-stage hydrocracking of hydrocarbon feeds for the production of middle distillates and optionally of oil bases advantageously comprises at least one first hydrorefining reaction zone, and at least one second reaction zone, in which the hydrocracking of at least a proportion of the effluent from the first reaction zone takes place. This process also comprises advantageously an incomplete separation of the ammonia from the effluent leaving the first zone. This separation is advantageously carried out by means of an intermediate hot flash. The hydrocracking taking place in the second reaction zone is advantageously carried out in the presence of ammonia in a quantity less than the quantity present in the feed, preferably less than 1500 ppm by weight, more preferably less than 1000 ppm by weight and even more preferably less than 800 ppm by weight of nitrogen.

The catalyst described according to the invention is therefore advantageously used in a single-stage fixed-bed hydrocracking process with intermediate separation, in a hydrocracking zone located downstream of a hydrorefining zone, an intermediate separation for partial removal of ammonia being applied between the two zones.

Preferably, the hydrorefining catalyst used in the first hydrorefining reaction zone, alone or in combination with another conventional hydrorefining catalyst, located upstream of the catalyst described according to the invention, is a catalyst optionally comprising a doping element selected from phosphorus, boron and silicon, said catalyst being based on non-precious group VIII elements and optionally in combination with group VIB elements on an alumina or silica-alumina support and even more preferably said catalyst comprises nickel and tungsten.

The catalyst described according to the invention can also advantageously be used in the first hydrorefining reaction zone, in converting pretreatment, alone or in combination with another conventional hydrorefining catalyst, located upstream of the catalyst described according to the invention, in one or more catalyst bed(s), in one or more reactor(s).

So-Called Two-Stage Process

The hydrocracking process according to the invention can advantageously be used in a so-called two-stage process.

Two-stage hydrocracking comprises a first stage, which has the purpose, as in the "single-stage" process, of performing hydrorefining of the feed, but also of achieving a conversion of the latter generally of the order of 40 to 60%. The effluent from the first stage then undergoes a separation (distillation) that is usually called intermediate separation, which has the purpose of separating the conversion products from the unconverted fraction. In the second stage of a two-stage hydrocracking process, only the fraction of feed not converted during the first stage is treated. This separation allows a two-stage hydrocracking process to be more selective for middle distillates (kerosene+ diesel) than a single-stage process. In fact, intermediate separation of the conversion products avoids their "over-cracking" to naphtha and gases in the second stage on the hydrocracking catalyst. Moreover, it should be noted that the unconverted fraction of the feed treated in the second stage generally has very low contents of $NH_3$ as well as organic nitrogen-containing compounds, generally less than 20 ppm by weight or even less than 10 ppm by weight.

The configurations of fixed-bed or ebullating-bed catalyst beds described in the case of a so-called single-stage process can advantageously be used in the first stage of a two-stage scheme, whether the catalyst according to the invention is used alone or in combination with a conventional hydrorefining catalyst.

The catalyst described according to the invention is therefore advantageously used in a so-called two-stage hydrocracking process, in the second hydrocracking stage located downstream of the first stage of hydrorefining, an intermediate separation being used between the two zones.

For the so-called single-stage processes and for the first hydrorefining stage of two-stage hydrocracking processes, the conventional hydrorefining catalysts that can be used advantageously are catalysts optionally comprising a doping element selected from phosphorus, boron and silicon, said catalyst being based on non-precious group VIII elements and optionally in combination with group VIB elements on an alumina or silica-alumina support and even more preferably said catalyst comprises nickel and tungsten.

Hydrotreatment/Hydrorefining of Hydrocarbon Feeds

The invention also relates to a process for hydrotreatment of hydrocarbon feeds using the catalyst described above, and said hydrotreatment process can advantageously be installed alone or upstream of a hydrocracking process.

The hydrotreatment and hydrorefining of hydrocarbon feeds such as petroleum fractions, fractions obtained from coal or hydrocarbons produced from natural gas relate to hydrogenation, hydrodesulphurization, hydrodenitrogenation, hydrodeoxygenation, hydrodearomatization and hydrodemetallation of hydrocarbon feeds containing aromatic and/or olefinic and/or naphthenic and/or paraffinic compounds, said feeds optionally containing metals and/or nitrogen and/or oxygen and/or sulphur.

More particularly, the feeds used in the hydrotreatment processes according to the invention are gasolines, gas oils, vacuum gas oils, atmospheric residues, vacuum residues, atmospheric distillates, vacuum distillates, heavy fuels, oils, waxes and paraffins, used oils, deasphalted residues or crudes, feeds obtained from thermal or catalytic conversion processes and mixtures thereof. They preferably contain heteroatoms such as sulphur, oxygen and nitrogen and/or at least one metal.

The hydrotreatment process according to the invention advantageously operates at a temperature between 200 and 450° C., preferably between 250 and 440° C., at a pressure between 1 and 25 MPa, preferably between 1 and 18 MPa, at a hourly space velocity between 0.1 and 20 $h^{-1}$, preferably between 0.2 and $5^{-1}$, and at a hydrogen/feed ratio expressed in volume of hydrogen, measured under standard conditions of temperature and pressure, per volume of liquid feed generally between 80 L/L and 5000 L/L and preferably between 100 L/L and 2000 L/L.

In the case where said hydrotreatment process is installed alone or upstream of a hydrocracking process, the catalyst described according to the invention can advantageously be used in the hydrotreatment reaction zone, in converting pretreatment, alone or in combination with another conventional hydrotreatment catalyst, located upstream of the catalyst described according to the invention, in one or more catalyst bed(s), in one or more reactor(s). The catalyst used in the hydrocracking process located downstream of the hydrotreatment process according to the invention can advantageously be identical to or different from the catalyst used in the hydrotreatment process according to the invention.

EXAMPLES

Example 1

Preparation of Z1 the Dealuminated Initial Zeolite Y According to the Invention 100 g of zeolite NaY raw from synthesis is exchanged 3 times with a 1 N solution of $NH_4NO_3$ at a temperature of 80° C., obtaining zeolite $NH_4Y$. The zeolite $NH_4Y$ then undergoes a thermal treatment at 700° C. for 3 h in the presence of 60% of steam. The thermal treatment is carried out using a gas stream formed from steam and air of 2 L/h/g of zeolite. The zeolite is then treated with a solution of 2 mol/L of $HNO_3$ (V/W=15) for 3 h at 80° C. The zeolite is finally filtered and dried for 12 h at 120° C. The zeolite is then in the dealuminated form HY.

The dealuminated zeolite HY obtained Z1 has an overall atomic ratio Si/Al=6.2 measured by X-ray fluorescence, an initial weight fraction of extra-lattice aluminium atoms equal to 37 wt. % relative to the total weight of aluminium present in the zeolite and measured by NMR of the aluminium, an initial mesopore volume measured by nitrogen porosimetry equal to 0.15 ml·$g^{-1}$, and an initial crystal lattice parameter $a_0$ equal to 24.35 Å, measured by XRD.

Example 2

Preparation of Z2 the Dealuminated Zeolite Y not According to the Invention

The zeolite Z1 prepared in Example 1 undergoes a second series of thermal treatment in the presence of steam and an acid attack treatment by washing with acid. The second thermal treatment is carried out at 750° C. using 80% of steam and the solution of acid used is 5 mol/L for 5 h.

The dealuminated zeolite HY Z2 has an overall atomic ratio Si/Al=25.4 measured by X-ray fluorescence, an initial weight fraction of extra-lattice aluminium atoms equal to 12 wt. % relative to the total weight of aluminium present in the zeolite measured by NMR of the aluminium, an initial mesopore volume measured by nitrogen porosimetry equal to 0.18 ml·g$^{-1}$, and an initial crystal lattice parameter $a_0$ equal to 24.25 Å, measured by XRD.

Example 3

Preparation of Z3 the Modified Zeolite According to the Invention Used in the Catalyst According to the Invention 100 g of dealuminated zeolite HY Z1 with overall atomic ratio Si/Al=6.2 measured by XF prepared in Example 1 is mixed with 1 L of a 0.1 N solution of sodium hydroxide (NaOH) at 60° C. for 30 min. After rapid cooling in ice water, the suspension is then filtered and the zeolite is washed at 50° C. and dried overnight at 120° C. The modified dealuminated zeolite Y is then exchanged 3 times with a 1 N solution of $NH_4NO_3$ at a temperature of 80° C., obtaining the partially exchanged form $NH_4^+$. Finally the zeolite is calcined at 450° C. for 2 h under an air stream of 1 L/h/g of zeolite. The characteristics of the zeolite Z3 measured by adsorption/desorption of nitrogen, X-ray fluorescence, NMR of $^{27}$Al and of $^{29}$Si and by adsorption of pyridine followed by IR are shown in Table 1.

Example 4

Preparation of Z4 the Modified Zeolite not According to the Invention 100 g of the dealuminated zeolite Y Z2 with overall Si/Al ratio equal to 25.4 is mixed with 1 of a 0.3 N solution of sodium hydroxide at 60° C. for 1.5 h. After rapid cooling in ice water, the suspension is then filtered and the zeolite is washed at 50° C. and dried overnight at 120° C. The modified dealuminated zeolite Y is then exchanged 3 times with a 1 N solution of $NH_4NO_3$ at a temperature of 80° C., obtaining the partially exchanged form $NH_4^+$. Finally the zeolite is calcined at 450° C. for 2 h under an air stream of 1 L/h/g of zeolite. The characteristics of the zeolite Z4 measured by adsorption/desorption of nitrogen, X-ray fluorescence, NMR of $^{27}$Al and of $^{29}$Si and by adsorption of pyridine followed by IR are shown in Table 1.

TABLE 1

Characterization of the samples

| | initial unmodified zeolite Z1 according to the invention | initial unmodified zeolite Z2 not according to the invention | modified zeolite Z3 according to the invention | modified zeolite Z4 not according to the invention |
|---|---|---|---|---|
| Overall Si/Al (XF) | 6.2 | 25.4 | 4.7 | 13.8 |
| % Al$_{VT}$ (NMR) | 37 | 12 | 33 | 13 |
| S$_{BET}$ (m$^2$/g) | 778 | 791 | 743 | 709 |
| Mesopore volume (ml/g) | 0.15 | 0.18 | 0.28 (+86%) | 0.30 (+72%) |
| Micropore volume (ml/g) | 0.28 | 0.27 | 0.25 (−11%) | 0.14 (−44%) |
| Brønsted acidity (a.u.) | 4.3 | 2.1 | 5.4 (+25%) | 1.9 (−10%) |

Example 5

Preparation of the Catalysts

The catalyst supports according to the invention containing the modified zeolites (Z3 and Z4) or unmodified zeolites (Z1 and Z2) are made using 18.5 g of zeolite mixed with 81.5 g of a matrix composed of ultrafine tabular boehmite or alumina gel marketed under the name SB3 by the company Condea Chemie GmbH. This mixture of powder is then mixed with an aqueous solution containing nitric acid at 66 wt. % (7 wt. % of acid per gram of dry gel) and then kneaded for 15 minutes. The kneaded paste is then extruded through a die with a diameter of 1.2 mm. The extrudates are then calcined at 500° C. for 2 hours in air.

The extrudates of support thus prepared are subjected to dry impregnation with a solution of a mixture of ammonium heptamolybdate and nickel nitrate and are calcined in air at 550° C. in-situ in the reactor. The catalysts C1, C2, C3 and C4 are thus prepared from the unmodified zeolites Z1 and Z2 and from the zeolites Z3 and Z4, respectively. The contents by weight of oxides in the catalysts obtained are shown in Table 2.

TABLE 2

Characteristics of the catalysts

| | Catalyst reference | | | |
|---|---|---|---|---|
| | C1 (not according to the invention) | C2 (not according to the invention) | C3 (according to the invention) | C4 (not according to the invention) |
| | Zeolite on which the catalyst is based | | | |
| | Z1 unmodified | Z2 unmodified | Z3 modified according to the invention | Z4 modified |
| MoO$_3$ (wt. %) | 12.3 | 12.2 | 12.3 | 12.0 |
| NiO (wt. %) | 3.0 | 3.3 | 3.1 | 3.0 |

TABLE 2-continued

Characteristics of the catalysts

| | Catalyst reference | | | |
|---|---|---|---|---|
| | C1 (not according to the invention) | C2 (not according to the invention) | C3 (according to the invention) | C4 (not according to the invention) |
| | Zeolite on which the catalyst is based | | | |
| | Z1 unmodified | Z2 unmodified | Z3 modified according to the invention | Z4 modified |
| Total SiO$_2$ (wt. %) | 14.3 | 14.1 | 13.9 | 14.1 |
| Remainder to 100% (mainly composed of Al$_2$O$_3$ (wt. %) | 70.4 | 70.4 | 70.7 | 70.9 |

Example 6

Comparison of the Catalysts in Single-Stage Hydrocracking of a Vacuum Distillate The catalysts the preparation of which was described in the preceding examples are used under the conditions of high-conversion hydrocracking (60-100%). The petroleum feed is a vacuum distillate that has undergone a first stage of hydrorefining on a catalyst with the principal characteristics shown in Table 3.

No stage of intermediate separation is used between the previous hydrorefining stage and the hydrocracking stage.

TABLE 3

Characteristics of the feed used

| Density (20/4) | 0.869 |
|---|---|
| Sulphur (ppm by weight) | 502 |
| Nitrogen (ppm by weight) | 10 |
| Simulated distillation | |
| initial point | 298° C. |
| 10% point | 369° C. |
| 50% point | 427° C. |
| 90% point | 481° C. |
| end point | 538° C. |

0.6 wt. % of aniline and 2 wt. % of dimethyl disulphide are added to the feed to simulate the H$_2$S and NH$_3$ partial pressures present in the second stage of hydrocracking. The feed thus prepared is injected into the hydrocracking test unit, which comprises a fixed-bed reactor, with ascending ("up-flow") circulation of the feed, in which 80 ml of catalyst is introduced. The catalyst is sulphurized with an n-hexane/DMDS+aniline mixture up to 320° C. Note that any method of in-situ or ex-situ sulphurization is suitable. Once the sulphurization has been carried out, the feed described in Table 3 can be converted. The operating conditions of the test unit are presented in Table 4.

TABLE 4

Catalyst testing conditions

| Total pressure | 9 MPa |
|---|---|
| Catalyst | 80 cm$^3$ |
| Hydrogen flow rate | 80 L/h |
| Feed flow rate | 80 cm$^3$/h |

The catalytic performance is expressed by the temperature that allows a raw conversion level of 70% to be reached and by the yields of gasoline and jet fuel (kerosene). This catalytic performance is measured on the catalyst after a period of stabilization, generally of at least 48 hours.

The raw conversion RC is put equal to:

RC=wt. % of 380° C. minus of the effluent with "380° C. minus" representing the fraction distilled at a temperature less than or equal to 380° C.

The yield of jet fuel (kerosene, 150-250, shown below as Yield Kero) is equal to the percentage by weight of compounds having a boiling point between 150 and 250° C. in the effluents. The yield of diesel fuel (250-380) is equal to the percentage by weight of compounds having a boiling point between 250 and 380° C. in the effluents.

The reaction temperature is fixed so as to reach a raw conversion RC equal to 70 wt. %. Table 5 shows the reaction temperature and the yields of light and middle distillates for the catalysts described in the examples given above.

TABLE 5

Catalytic activities of the catalysts in hydrocracking

| | T (° C.) | Kerosene yield (wt. %) | Diesel fuel yield (wt. %) |
|---|---|---|---|
| C1 not according to the invention (prepared from unmodified Z1) | 386 | 23.9 | 19.3 |
| C2 not according to the invention (prepared from unmodified Z2) | 391 | 19.9 | 17.2 |
| C3 according to the invention (prepared from Z3 modified according to the invention) | 384 | 24.1 | 22.4 |
| C4 not according to the invention (prepared from modified Z4) | 393 | 20.3 | 18.2 |

Catalyst C3 prepared with the modified zeolite Z3 according to the invention gives an activity in hydroconversion of vacuum distillate and a selectivity for middle distillates (kerosene+diesel fuel) that are greatly improved relative to catalysts C2 and C4 respectively, wherein C2 is prepared from an unmodified zeolite Z2 and not having the required overall Si/Al ratio and C4 is prepared from the modified zeolite Z4 (i.e., a modified zeolite prepared from Z2). Catalyst C3 also has greatly improved activity and selectivity relative to catalyst C1 prepared from the unmodified initial zeolite Z1.

The entire disclosures of all applications, patents and publications, cited herein and of corresponding French application No. 09/05.404, filed Nov. 10, 2009 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for modifying a dealuminated zeolite Y comprising:
    a basic treatment stage wherein said dealuminated zeolite Y is mixed with a basic aqueous solution, said basic aqueous solution being a solution of basic compounds selected from alkali metal carbonates and alkali metal hydroxides, wherein said basic treatment stage is carried out at a temperature between 40 and 100° C. and for a duration between 5 minutes and 5 hours;
    a partial exchange stage wherein 85 to 99.5% of alkaline cations, introduced during said basic treatment stage, are exchanged with $NH_4^+$ cations, whereby the remaining content of alkaline cations is such that the molar ratio of alkaline cations to aluminum is between 0.15:1 and 0.005:1; and
    at least one thermal treatment stage which is carried out at a temperature between 200 and 700° C.

2. A process according to claim 1, wherein said dealuminated initial zeolite Y has, before it is modified, an overall initial atomic ratio of silicon to aluminum between 2.7 and 10.0.

3. A process according to claim 1, wherein said dealuminated initial zeolite Y has, before it is modified, an initial weight fraction of extra-lattice aluminum atoms greater than 30 wt. % relative to the total weight of aluminum present in the zeolite.

4. A process according to claim 1, wherein the resultant modified dealuminated zeolite Y has a final mesopore volume measured by nitrogen porosimetry at least 10% greater relative to the initial mesopore volume of the initial dealuminated zeolite Y, a final micropore volume measured by nitrogen porosimetry that is not decreased by more than 40%, relative to the initial micropore volume of said the initial dealuminated zeolite Y, a Brønsted acidity more than 10% higher relative than the Brønsted acidity of the initial dealuminated zeolite Y, and a final crystal lattice parameter $a_0$ greater than the initial crystal lattice parameter $a_0$ of the initial dealuminated zeolite Y.

5. The process according to claim 1, in which, before being modified, the dealuminified Y zeolite has an initial overall atomic ratio of silicon to aluminum of between 2.6 and 12.0.

6. The process according to claim 1, in which, before being modified, the dealuminified Y zeolite has a starting extra-lattice aluminum atom fraction by weight that is greater than 20% by weight relative to the total mass of the aluminum that is present in the zeolite.

7. The process according to claim 1, in which, before being modified, the dealuminified Y zeolite has a mesopore volume, measured by nitrogen porosimetry, of greater than $0.10\ ml\cdot g^{-1}$.

8. The process according to claim 1, in which, before being modified, the dealuminified Y zeolite has a mesopore volume, measured by nitrogen porosimetry, of greater than $0.13\ ml\cdot g^{-1}$.

9. The process according to claim 1, in which, before being modified, the dealuminified Y zeolite has a mesopore volume, measured by nitrogen porosimetry, of greater than $0.20\ ml\cdot g^{-1}$.

10. The process according to claim 1, in which, before being modified, the dealuminified Y zeolite has a mesopore volume, measured by nitrogen porosimetry, of greater than $0.25\ ml\cdot g^{-1}$.

11. The process according to claim 1, in which, after being modified, the dealuminified Y zeolite has a mesopore volume, measured by nitrogen porosimetry, that is greater than at least 10% relative to the mesopore volume before modification.

12. The process according to claim 1, in which, after being modified, the dealuminified Y zeolite has a mesopore volume, measured by nitrogen porosimetry, that is greater than at least 20% relative to the mesopore volume before modification.

13. The process according to claim 1, wherein prior to being modified the dealuminated zeolite Y has an overall initial atomic ratio of silicon to aluminum between 2.5 and 20, an initial weight fraction of extra-lattice aluminum atoms greater than 10%, relative to the total weight of aluminum present in the zeolite, an initial mesopore volume measured by nitrogen porosimetry greater than $0.07\ ml\cdot g^{-1}$, and an initial crystal lattice parameter $a_0$ between 24.38 Å and 24.30 Å.

14. The process according to claim 1, wherein after the partial exchange stage the molar ratio of alkaline cations to aluminum is between 0.12:1 and 0.01:1.

15. The process according to claim 1, wherein the partial exchange is performed under the following conditions: an $NH_4+$concentration of 1 and 10 mol/L in the exchange solution, at temperature of 60 and 95° C., and a cation exchange number of between 1 and 4.

* * * * *